US012786551B2

(12) United States Patent
Fischmann

(10) Patent No.: US 12,786,551 B2
(45) **Date of Patent: *Nov. 3, 2026**

(54) MULTI SHUTTER CAMERA APP THAT SELECTIVELY SENDS IMAGES TO DIFFERENT ARTIFICIAL INTELLIGENCE AND INNOVATIVE PLATFORMS THAT ALLOW FOR FAST SHARING AND INFORMATIONAL PURPOSES

(71) Applicant: YAE, LLC, Miami, FL (US)

(72) Inventor: Fernando Fischmann, Miami, FL (US)

(73) Assignee: YAE, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/903,825

(22) Filed: Oct. 1, 2024

(65) Prior Publication Data

US 2025/0024135 A1 Jan. 16, 2025

Related U.S. Application Data

(63) Continuation-in-part of application No. 18/472,900, filed on Sep. 22, 2023.

(Continued)

(51) Int. Cl.
*H04N 23/63* (2023.01)
*G06F 3/0482* (2013.01)

(Continued)

(52) U.S. Cl.
CPC ......... *H04N 23/632* (2023.01); *G06F 3/0482* (2013.01); *G06F 3/04886* (2013.01);

(Continued)

(58) Field of Classification Search
CPC .. H04N 23/667; H04N 23/632; H04N 23/633; H04N 23/64; H04N 23/62;

(Continued)

(56) References Cited

U.S. PATENT DOCUMENTS

| | | | |
|---|---|---|---|
| 9,019,415 | B2 | 4/2015 | Ma et al. |
| 9,554,036 | B1 | 1/2017 | Lin |

(Continued)

OTHER PUBLICATIONS

International Search Report and Written Opinion for Application No. PCT/US23/85865 mailed Apr. 23, 2024.

*Primary Examiner* — Kelly L Jerabek
(74) *Attorney, Agent, or Firm* — Merchant & Gould P.C.

(57) ABSTRACT

A multi-shutter camera application and method selectively sends images to different artificial intelligence and innovative platforms for fast sharing and informational purposes. An electronic device with a touch sensitive display and a processor is utilized. A capture screen on the display includes a multi-shutter view (a live view and at least two selective capture buttons (e.g., shutters)) for capturing media content. The method may include receiving input from the buttons to capture the content and direct it to an artificial intelligence platform; processing the content information based on the selected button; analyzing the content through parameters and show options to the user on the same screen that displays the content; and presenting a plurality of selectable options related to the user's selected shutter and intent of capturing the content, including, but not limited to uses related to at least one of the following: discovery, shopping and sharing functionality alternatives.

30 Claims, 4 Drawing Sheets

Related U.S. Application Data

(60) Provisional application No. 63/508,749, filed on Jun. 16, 2023.

(51) Int. Cl.

| | |
|---|---|
| ***G06F 3/04886*** | (2022.01) |
| ***G06V 10/70*** | (2022.01) |
| ***G06V 10/94*** | (2022.01) |
| ***H04M 1/72439*** | (2021.01) |
| ***H04M 1/72445*** | (2021.01) |
| ***H04N 23/667*** | (2023.01) |

(52) U.S. Cl.

CPC ... *H04M 1/72439* (2021.01); *H04M 1/72445* (2021.01); *H04N 23/633* (2023.01); *H04N 23/667* (2023.01); *G06V 10/70* (2022.01); *G06V 10/95* (2022.01); *H04M 2250/52* (2013.01)

(58) Field of Classification Search

CPC . H04N 23/631; G06F 3/0482; G06F 3/04886; H04M 2250/52; H04M 1/72445; H04M 1/72439; G06V 10/95; G06V 10/70

See application file for complete search history.

(56) References Cited

U.S. PATENT DOCUMENTS

| | | | | |
|---|---|---|---|---|
| 9,565,334 | B2 | 2/2017 | Freltoft | |
| 9,871,962 | B2 | 1/2018 | Stricker | |
| 10,079,972 | B2 | 9/2018 | Liao | |
| 10,205,881 | B2 | 2/2019 | Jung et al. | |
| 10,225,471 | B2 | 3/2019 | Poindexter, Jr. | |
| 10,440,276 | B2 | 10/2019 | Gupta et al. | |
| 10,542,205 | B2 | 1/2020 | Stricker | |
| 11,019,279 | B2 | 5/2021 | O'Neill | |
| 11,574,470 | B2 | 2/2023 | Anorga et al. | |
| 12,120,417 | B1 | 10/2024 | Fischmann | |
| 12,314,545 | B2 | 5/2025 | Fischmann | |
| 12,498,845 | B2 | 12/2025 | Fischmann | |
| 12,526,509 | B2 * | 1/2026 | Fischmann | H04N 23/631 |
| 2014/0028885 | A1 | 1/2014 | Ma et al. | |
| 2015/0033129 | A1 | 1/2015 | Cho et al. | |
| 2015/0326778 | A1 | 11/2015 | Freltoft | |
| 2017/0048454 | A1 | 2/2017 | Lin | |
| 2017/0257559 | A1 | 9/2017 | Stricker | |
| 2017/0264818 | A1 | 9/2017 | Liao | |
| 2017/0374245 | A1 | 12/2017 | Rolczynski | |
| 2018/0103208 | A1 | 4/2018 | Jung et al. | |
| 2018/0213143 | A1 | 7/2018 | Stricker | |
| 2019/0132520 | A1 | 5/2019 | Gupta et al. | |
| 2020/0021749 | A1 | 1/2020 | O'Neill | |
| 2020/0389600 | A1 | 12/2020 | Capurso et al. | |
| 2021/0089775 | A1 | 3/2021 | Anorga et al. | |
| 2022/0086349 | A1 | 3/2022 | Tadano et al. | |
| 2022/0337741 | A1 * | 10/2022 | Paul | G06F 3/04886 |
| 2022/0395194 | A1 | 12/2022 | Motoyoshi et al. | |
| 2022/0417417 | A1 | 12/2022 | Lu et al. | |
| 2023/0229279 | A1 | 7/2023 | Paul et al. | |
| 2023/0276118 | A1 | 8/2023 | Misawa | |
| 2024/0107137 | A1 * | 3/2024 | Lui | H04N 23/45 |
| 2024/0292096 | A1 * | 8/2024 | Xu | H04N 23/632 |
| 2024/0323534 | A1 * | 9/2024 | Pham | G06V 10/25 |
| 2024/0422423 | A1 | 12/2024 | Fischmann | |

* cited by examiner

MULTI SHUTTER CAMERA APP THAT SELECTIVELY SENDS IMAGES TO DIFFERENT ARTIFICIAL INTELLIGENCE AND INNOVATIVE PLATFORMS THAT ALLOW FOR FAST SHARING AND INFORMATIONAL PURPOSES

CROSS-REFERENCE TO RELATED APPLICATIONS

This application is a continuation-in-part of U.S. patent application Ser. No. 18/472,900, filed Sep. 22, 2023, which claims the benefit of U.S. Provisional Patent Application No. 63/508,749, filed Jun. 16, 2023. The disclosure of these priority applications is hereby incorporated in their entirety by reference into the present application.

FIELD OF THE INVENTION

The present disclosure relates to a method and application that provides for a multi-shutter camera application in an electronic device, and which selectively sends the images and other media content captured with the application to different innovative platforms based on artificial intelligence, and that presents a series of options based on the selected shutter and the image type and information (such as geolocation, time of capture, content, among others), such as for fast sharing purposes and/or informational purposes, among other uses.

BACKGROUND OF THE INVENTION

With the rapid proliferation of electronic devices such as mobile electronic devices, people use such electronic devices for capturing and sharing images (and other media content), on a daily basis. More and more electronic devices such as mobile phones are being used to capture and display various media content, including photos and videos.

Every day, the gap between the use of digital cameras and mobile phone cameras is closed a bit further, since the processors, functionalities, and capabilities have improved greatly over the past years. Smartphone cameras have gone from being a novelty at some point to becoming one of the world-s most popular way of capturing media content such as photos and videos, given its simplicity, case of use, convenience, case of reach, quick use, and given that the final quality of the content has nothing to envy conventional digital cameras.

By 2015, smartphone sales surpassed traditional camera sales, and since then the numbers have only become more extreme. A phrase made famous by iPhone icon Chase Jarvis is clear, “the best camera is the one that you have with you”, which describes how convenient is to have a camera functionality, in this case within a smartphone, which a user can easily access to capture content on a daily and frequent basis.

This rapid rise of smartphone photography does not only cover photos as one would with digital cameras, but users worldwide take photos of themselves, social activities, sports, food, documents, something they want to remember later, a color they liked, a book they read, a sentence that stuck, a condiment they tasted, a product they wish to get later, and many other uses that can be given to a single photo, differently that the use that was given to photos using digital cameras.

Users today have the option of using such images/photos that they’ve captured in many ways, and easily because such capture functionality is within the same smartphone which is then used to share content, look for information of something, purchase a product, read reviews, obtain help, among many other uses that before were not an option or at least not an easy one where the photo had to be downloaded into a different electronic device before being able to use it. Before, doing anything with photos captured on a digital camera generally necessitated a lot of effort and a complicated set of steps, which can be made more efficient by the use of smartphones.

However, although the actual process of capturing media content itself can be found within smartphones, the recognition and identification of the intent that the user wants for such content today is not an easy task, and generally requires several steps to be performed in different applications within the smartphone.

Today, there are no applications that are able to capture media content such as photos, which are then used for different purposes or functionalities based on the intent of the user. The camera application native to smartphones is generally a camera that allows capturing content and saves all content in the same platform, to which then the user must identify and use such content based on its intent. For example, a mother taking a photo of her child then wants to share such photo with her family, which means that she needs to use a third-party application to share such photo with her contacts. However, when the same mother wants to capture an image of a flower she saw at a garden in order to find out its name or more information about it, the camera just captures the photo and the mother has to research which application to download and use to upload such photo and obtain the desired information. Within the same context, if the same mother wants to take a picture of the laundry detergent that she liked in order to find out where/how to purchase such product, she has to research which application to download and use to upload such photo and obtain the desired information related to the purchase of such product (or just read reviews or information related to such product).

Today, there are no centralized applications that allow to selectively capture media content and that can identify the purpose of such content in order to aid the user fulfill the intent of which such content was captured.

Further, the design and functionalities of camera applications has not changed over the years, where traditional camera functionality basically includes two elements: a screen to view the live content that can be captured through the camera lens, and a shutter button that captures such content. However, there have been no improvements or innovations as to how such media capture screen looks or its functionalities. Today, there are no selective or intelligent cameras with different functionalities that allow differentiating the context of the photo that is being taken in order to determine how that photo is used based on the intent of the user.

It is in this general technical context that aspects of the present disclosure are implemented, disruptive improvements on the above being described below, promoting a revolution in image and content communication.

SUMMARY

The present disclosure pertains to a method and application that provides for a multi-shutter camera application in an electronic device, and which selectively sends the images and other media content captured with the application to different artificial intelligence and innovative platforms, and that presents a series of options dependent on the selected shutter and the image type and information (such as geolocation, time of capture, content analysis, among others) such as for fast sharing purposes and/or informational purposes, among other uses.

In more detail, an artificial intelligence system processes the image dependent on the selected shutter and the image type and information (such as geolocation, time of capture, content analysis, among others), and presents a series of alternatives that the user can select such as for fast sharing purposes and/or informational purposes, within the same screen. This fast, simple, and innovative platform with intelligent image capture and processing will change the way images are used and create a revolution in many areas like, image sharing with contacts, social media, shopping, obtaining information about the world around us, etc.

The disclosure aims at providing an application that allows to selectively capture media content and that can identify the purpose of such content in order to aid the user fulfill the intent of which such content was captured. This innovative application provides for an intelligent multi-shutter interface that directs captured media content to an artificial intelligence platform which then processes such content and suggests a series of alternatives and/or options based on the user's intent when capturing the image with the chosen capture button. Therefore, the present disclosure represents an important innovation over current methods and applications, allowing centralizing the use of media content, such as photos, for many uses through one application that intuitively suggests alternatives/options/actions related to such photo based on the user's objective.

DESCRIPTION OF THE INVENTION

In accordance with the following disclosure, it is noted that the present application describes a method, software, e.g., an "application," and/or a device that can integrate the functionalities of selective media capture through a multi-shutter camera application, using mobile devices, such as smartphones in an intuitive and innovative way and with the use of artificial intelligence in order to easily fulfill the user's intent of the photo by selectively capturing and showing the best platform related to such photo and its objective.

This innovative application provides for an intelligent multi-shutter interface that directs captured media content to an artificial intelligence platform which then processes such content and suggests a series of alternatives and/or options based on the user's intent when capturing the image with the chosen capture button, using an innovative platform. Therefore, the present disclosure represents an improvement over current methods and applications, allowing centralizing and facilitating the use of media content, such as photos, for many uses through one application that intuitively suggests alternatives/options/actions related to such photo based on the user's objective, which are shown in the same screen as the captured content.

Figure 1:
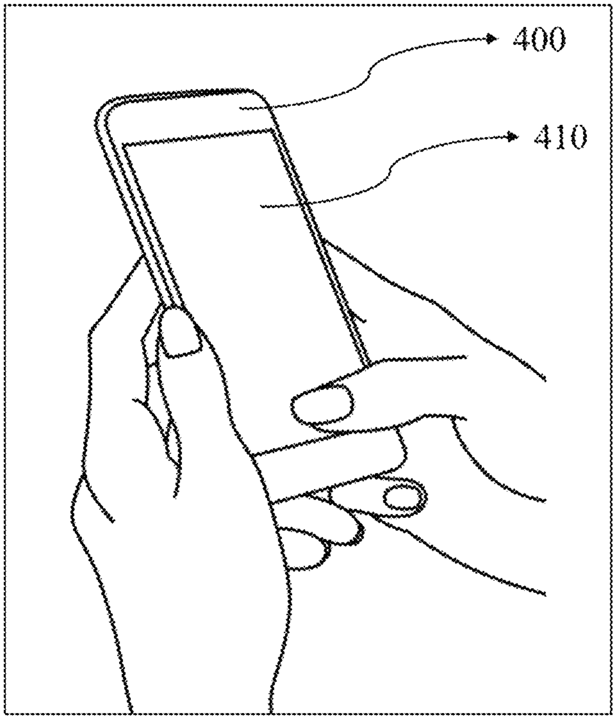
FIG. 1 shows an embodiment of the invention, wherein an electronic device (400) is shown, corresponding to a mobile phone, specifically a smartphone, having a display (410) with a touch sensitive surface.
Figure 2:
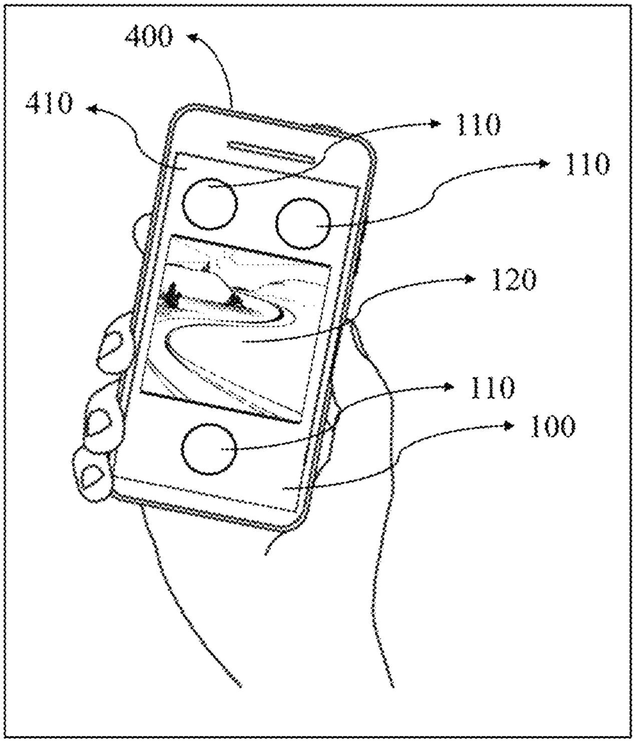
FIG. 2 shows an embodiment of the invention, wherein an electronic device (400) is shown, corresponding to a mobile phone, specifically a smartphone, having a display (410) with a touch sensitive surface, wherein a capture screen (100) is presented on the display (410). The capture screen (100) comprises a multi shutter view, having a plurality of selective capture buttons (110), such as shutters, and a live-view block (120).
Figure 3:
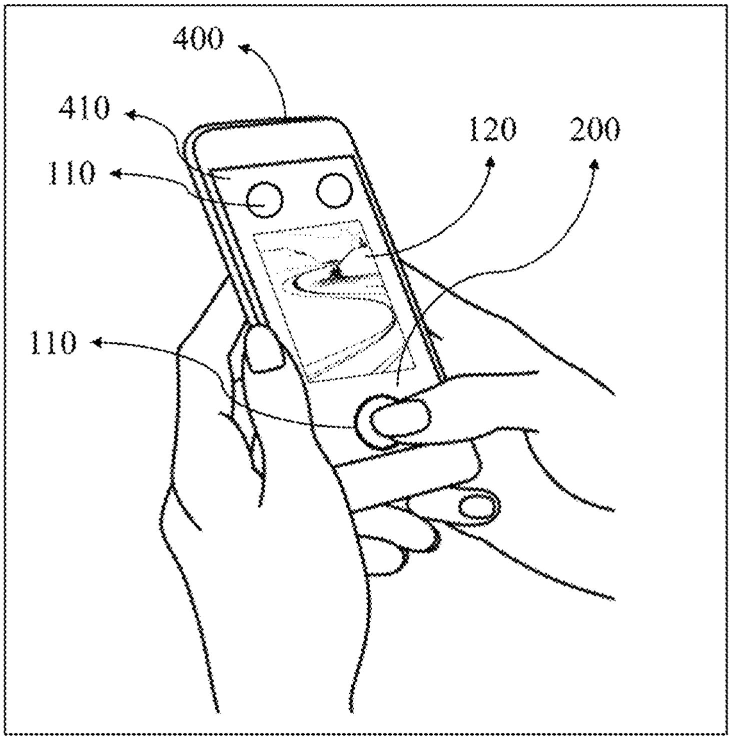
FIG. 3 shows an embodiment of the invention, wherein an electronic device (400) is shown, corresponding to a mobile phone, specifically a smartphone, having a display (410) with a touch sensitive surface, wherein a capture screen (100) is presented on the display (410). The capture screen (100) comprises a multi shutter view, having a plurality of selective capture buttons (110), such as shutters, and a live-view block (120), and wherein a user performs an input action (200), such as a tap, over the chosen selected capture button (110).
Figure 4:
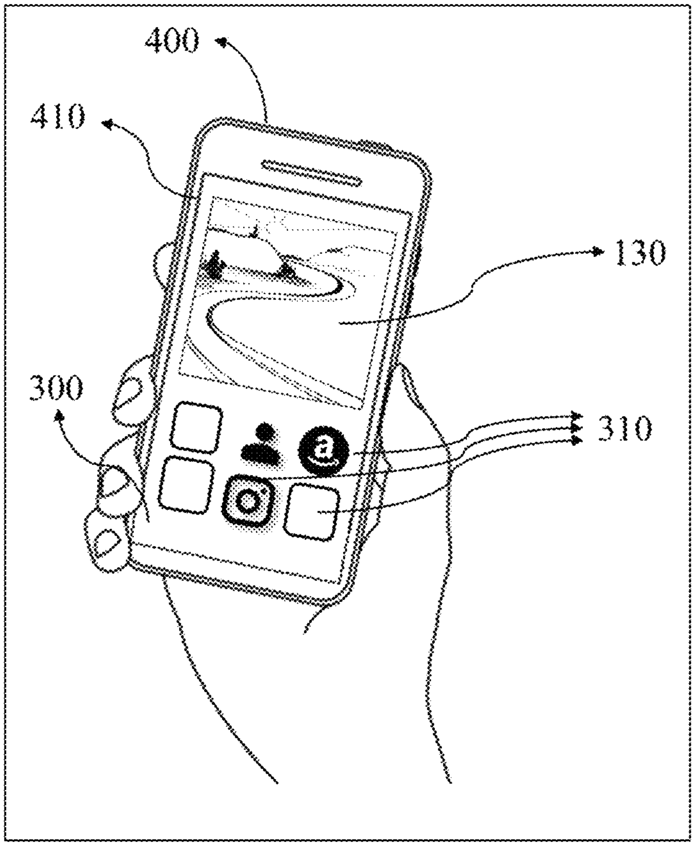
FIG. 4 shows an embodiment of the invention, wherein an electronic device (400) is shown, corresponding to a mobile phone, specifically a smartphone, having a display (410) with a touch sensitive surface, wherein a content screen (300) is presented on the display (410). The content screen (300) comprises captured media content (130) and a series of alternatives and/or options (310), such as websites, applications, contacts, among others, provided by the artificial intelligence system based on the selected captured button and the media content (130) type and information (such as geolocation, time of capture, content, among others).

In a first embodiment of the invention, a method performed by an electronic device having a touch sensitive display, such as a smartphone, is provided, whereby a user intends to capture media content, such as an image, in order to fulfill an objective, and the user is presented with a capture screen (100) having multi-shutter view, the capture screen comprising at least two selective capture buttons (110) as seen in FIG. 1, and at least one live view block (120), which shows the content that can be captured through the at least two selective capture buttons (110), such as independent shutters. The user then performs an input action (200) over at least one of the selective capture buttons (110), such as a tap, which provides input to the application to capture such media content (130), and triggers the display to show a content screen (300), wherein the content screen shows different options based on an artificial intelligence analysis of the captured media content (130).

In this first embodiment of the present disclosure, a method performed by an electronic device, the electronic device (400) comprising a display (410) incorporating a touch sensitive surface (411) and at least one processor, the method comprising:

a) Presenting a capture screen (100) on the display (410) having a multi-shutter view, the content screen comprising at least one live view block (120) and at least two selective capture buttons (110), such as shutters, for capturing media content;

b) Receiving an input action (200), such as a tap, over at least one of the selective capture buttons (120), the input action providing input at the at least one selective capture button, wherein the selective capture buttons are intended to capture media content and direct the captured content to an artificial intelligence platform to provide different uses and/or information to the user;

c) Capturing media content (130) through the input action (200) from step b), such as a tap over a shutter button, and saving such content into the electronic device (400) or a cloud-based application;

d) In response to the input action (200), selectively sending the media content (130) to an artificial intelligence platform, where the artificial intelligence platform:

i. processes such captured media content (130) information based on the chosen selective capture button (110) that was used to capture the media content (130), and ii. processes the media content (130) and analyzes such media content (130) through parameters (such as geolocation, time of capture, content of the photo, among others) to show suitable options to the user to fulfill the objective of the captured content (130) in the same screen that displays the captured content (130)

wherein the artificial intelligence platform providing output information in order to present the user with a content screen (300);

e) Presenting a content screen (300) that shows content generated by the Artificial Intelligence Platform from step d), wherein the content screen (330) shows a plurality of selectable alternatives and options related to the user's selected shutter and intent of capturing the content, including, but not limited to uses related to at least one of the following:

A. Discovery functionality alternatives, that presents information that are related to the captured content (130) such as websites, applications, contacts, and/or media content, B. Shopping functionality alternatives, such as websites, applications, contacts, media content, and or information that are related to the captured content (130), C. Sharing functionality alternatives, such as combinations and alternatives to easily share such photo with other users and/or social media platforms, as intended by the user based on the captured content (130).

As described in the following sections, options A, B, and C related to the content screen are provided in more detail, as well as their uses and functionality.

The method of the disclosure may be integrated throughout the electronic device (400) user interface and/or a third-party application installed within the device (not a native application). In particular, the method of the invention may be implemented with a mobile application or utility installable on a mobile device, i.e., a third-party application. The method of the invention may also, or alternatively, be implemented by the mobile device native user interface.

The method and application from the present disclosure comprises a camera feature, wherein the method performed by the electronic device includes the use of a camera feature configured to capture media content, and wherein the electronic device includes camera hardware and software for this purpose. As used herein, the camera feature comprises a camera application and/or capture processes that allow accessing and using the camera hardware in the electronic device for the capture of media content. Camera hardware includes different types of lenses and sensors integrated into the electronic device.

In an embodiment, the capture screen (100) makes use of the camera feature from an electronic device, such as a smartphone, in order to show a live view block (120) of the content that can be captured. In such embodiment, the application from the present disclosure integrates the functionalities of the camera feature that is native to the smartphone, and allows using such functionalities in order to visualize and capture media content that is captured through the camera hardware and/or software of the smartphone.

In a preferred embodiment, the application from the present disclosure is a camera application, wherein the camera application is a third-party application and not the native camera application from the electronic device.

As used herein, the live view block (120) refers to at least a portion of the capture screen (100) that shows the live stream content that can be captured by the user. The dimensions and ratio of such live view block may be customizable by the user, and may be adapted depending on the number of selective capture buttons (110) that are shown at the capture screen (100).

As used herein, the selective capture button (110) comprises a defined selected region within the display of the electronic device that is intended to receive input in order to capture the media content, process, and download such content into the electronic device or a cloud-based application. The selective capture button can be selected from the group comprising a shutter button, or a region configured to receive an input action, among others.

In an embodiment, a separate folder within the camera roll or photo view application of the electronic device is created, wherein such folder displays the media content (130) captured by the method and application of the present disclosure. In an embodiment of the invention, by tapping an image within such separate folder, multiple options for AI platforms are shown, so the user can select which one to use to process to show related options based on the user's selection.

The media content that can be captured through the application includes, but is not limited to, photos and videos.

The electronic device (400) according to the invention may be any electronic device that enables an electronic communication between different devices, but is selected preferably from a mobile phone, such as a smartphone. In certain preferred embodiments, the electronic device comprises a touch sensitive surface (411).

As used herein, an input action (200) includes one or more actions and/or motions performed by the user, which can be selected from the group comprising at least one of a touch, a click, a tap, a swipe, a flicking, a flinging, or a grabbing (e.g., a "pinch") of a portion of an interface provided for display on a display screen, among others, as well as combinations thereof. An input action (200) may also be a motion or pressure made by the user's hand or fingers that is detected by the electronic device, for example by contact with the touch sensitive surface (411) or with the hardware, such as a physical button. An input action therefore may be a physical movement performed by the user and include one or more characteristics such as direction, pressure, duration, etc., relative to contact to the touch sensitive surface. In an example, an input action includes a single tap, a single touch, one or more consecutive taps in the same or different regions, a simultaneous tap or touch in the same or different regions, simultaneous rapid tap or touch in the same or different regions a repeated tap or touch in the same or different regions, and combinations thereof. In an embodiment, multiple input actions may be performed by a user.

In an embodiment, the input action (200) is received over at least one of the selective capture buttons (120) as an input action combination selected from the group comprising: actions separated by time intervals, individual inputs, simultaneous inputs, prolonged inputs, scroll inputs, or combination thereof, among others. A scroll input is an input action where a user touches the screen and moves their finger in a line in any direction while still pressing the screen.

For instance, a user may interact with multiple selective capture buttons (110) within the capture screen (100) in different ways, such as pressing one button and then another after a short delay, pressing different buttons individually, pressing two or more buttons simultaneously, or holding one or more buttons for an extended duration. Each of these input actions triggers the artificial intelligence platform to process the captured media content (130) differently, depending on the combination of inputs, and offers contextually relevant options to the user, enhancing the versatility and functionality of the multi-shutter interface.

Another example includes capturing two consecutive images within a predetermined period of time, or with specific input actions, where the artificial intelligence platform will analyze the two images as input information and will provide suggestions to the user based on the potential connections and analysis of the content within the two images separately and in combination. As a specific example, if a user takes a photo of a wine bottle and a cheese board, the artificial intelligence platform may direct the user to websites that discuss pairing cheese and wine and whether it is a good combination, shopping websites to get those elements, restaurants to go cat such food, among others.

In an embodiment, upon performing the input action, the at least one selective capture button (110) of the multi-shutter camera application, captures the media content (130), and an option to include additional instructions is provided to the user. For example, after capturing an image, the user may add a text or audio to describe the context or give a specific instruction. The additional instructions relate to the captured content so that the system is able to process the image according to the user's instructions and past experiences. The artificial intelligence platform then processes the captured media content (130) in conjunction with the additional instructions, generating more precise and tailored suggestions or actions for the user based on the combined data. The additional instructions are specifically integrated into the framework of the multi-shutter camera application of the present invention and enable the application to process and provide suggestions based on the user's specific inputs, selective capture buttons (110) and the context provided. This approach enables the system to offer precise outputs for each media content (130), enhancing the overall user experience by adapting to their preferences and past interactions within the multi-shutter framework. This contrasts with the provision of instructions on a system such as a conventional camera application in which the specific synergy between the multi-shutter framework and additional audio or text instructions would be nonexistent, thereby failing to provide a tailored output based on the integration of selective capture buttons (110), media content (130), preferences and past interactions, with the additional instructions.

In an embodiment, the multi-shutter camera application and method provides a plurality of selectable cameras, each corresponding to a different usage context, such as work, travel, or personal use. This feature allows users to customize the application's functionalities based on their current needs and situations, enhancing the overall user experience. Each camera comprises a set of selective capture buttons (110) configured according to the corresponding usage context. For example, in a work-related camera, the artificial intelligence platform associated with this camera could be tailored to suggest converting images to PDFs, extract contact information from business cards, or provide specific recommendations related to the user's profession. Or in a travel camera, the artificial intelligence platform could focus on recognizing landmarks, providing historical information, translating text, or suggesting nearby attractions.

Users can switch between cameras seamlessly within the system, allowing them to adapt the system's functionalities to suit different situations. The camera selection can be accessed through a user-friendly interface, such as a menu or a swipe gesture, enabling quick transitions between contexts. The set of selective capture buttons (110) displayed on the capture screen (100) updates to reflect the functionalities relevant to the chosen profile. By providing camera-specific processing, the application enhances the relevance and usefulness of the information and options presented to the user. This context-aware approach ensures that users receive outputs that are most pertinent to their immediate needs, reducing the time and effort required to achieve their objectives.

In an embodiment, the multi-shutter camera application comprises only one camera corresponding to one usage context. The system itself is made with a specific camera tailored for a particular usage context, such as a dedicated work-only application, a travel-specific application, or an application designed exclusively for personal use. In this embodiment, the multi-shutter camera application is developed to focus solely on one camera, embedding all functionalities, selective capture buttons (110), and artificial intelligence platform features relevant to that specific context. By creating an application with a specific camera, users who primarily operate within a single context can benefit from a streamlined and optimized user experience. This dedicated approach ensures that all aspects of the system, from the user interface to the AI processing algorithms, are fully aligned with the intended use case.

In such case that input action combinations are used, the artificial intelligence system may suggest different combinations of functionalities and alternatives to the user that may mix different suggestion types, for example a mix of discovery, sharing, shopping, and potentially many other functionalities that relate to analysis of information.

The method of the present application uses artificial intelligence that is programmed to detect and analyze the content of the photos, learn from user's past input actions, searches, interests, interactions with the web and other applications, messaging patterns, among others. The artificial intelligence system can also perform analysis of the photos to detect and analyze any elements, text, symbols, logos, colors, textures or other parameters within the photo. Additionally, the artificial intelligence platform can perform an analysis of the photo based on its georeferenced location (geolocation), which can help to identify the intent of the user when taking the photo. The artificial intelligence system can perform an analysis of the photo based on the time of capture and/or the time when the user is using the application from the present disclosure.

The artificial intelligence platform is paired with the user's selection based on the multi-shutter option found in the display. In an innovative and new manner, the smartphone's screen of the present application displays an innovative multi-shutter view, comprising at least two different and separate selective capture buttons, such as shutters, that allow the user capturing a photo depending on the intent and objective that the user wishes to provide to such photo. This is a new functionality developed in the context of the present disclosure, where the application allows to selectively capture an image, and then processing such information through artificial intelligence in order to suggest suitable alternatives and options related to the original intent of capturing such photo.

This is all performed through the innovative multi-shutter view, where the different selective capture buttons have different functions that can be pre-defined in the application, or that can change manually or automatically based on a series of inputs.

Discovery Functionality

In an embodiment of the invention, at least one of the selective capture buttons operates as a Discovery Shutter related to a Discovery Functionality, wherein the Discovery Shutter is a shutter that, when the user takes a photo using such button then the application selectively sends such image and information to an artificial intelligence platform that is able to analyze the information of the image (as previously described), and interact with the web and with its own learning patterns in order to suggest the best applications, websites, or functionalities related to such photo. The Discover Functionality is therefore related to providing information/operations related to the photo that is being captured through the Discovery Shutter, as intended by the user.

Examples of the Discovery Functionality include, but are not limited to searching information about an element, text, symbol, logo, colors, textures, or other features found in the photo and suggest a series of websites, applications, or operations related to such features. For example, if a user takes a photo of the Eiffel Tower in Paris, France using the Discovery Shutter, the present application could identify that the main element is the Eiffel Tower and suggest websites or applications that show historical information about the Eiffel Tower, websites or applications that help in booking tours or other visiting alternatives to the Eiffel Tower, websites or applications that suggest other activities to do nearby the location of the Eiffel Tower, websites or applications that show dining alternatives close to the Eiffel Tower, among many other options.

When a user captures a photo with the Discovery Shutter, they selectively intend to use the content of such photo for a purpose to find out more information or activities related to the overview of the captured photo, and therefore the artificial intelligence platform processes such captured photo based on the chosen selective capture button and provides output information in order to present the user with a dynamic content screen that automatically re-orders the found and suggested websites and/or applications related to information and/or activities based on the photo. As used herein, discovery functionality alternatives include but are not limited to websites, applications, contacts, media content, and or information that are related to the captured content (130) in the context of the discovery functionality.

Shopping Functionality

In an embodiment of the invention, at least one of the selective capture buttons operates as a Shopping Shutter related to a Shopping Functionality, wherein the Shopping Shutter is a shutter that, when the user takes a photo using such button then the application selectively sends such image and information to an artificial intelligence platform that is able to analyze the information of the image (as previously described), and interact with the web and with its own learning patters in order to suggest the best applications, websites, or functionalities related to such photo. The Shopping Functionality is therefore related to providing information/operations related to the photo that is being captured through the Shopping Shutter, as intended by the user.

Examples of the Shopping Functionality include, but are not limited to searching information about a product, service, element, text, symbol, logo, colors, textures, or other features found in the photo and suggest a series of websites, applications, or operations related to such features, in the context of shopping purposes. For example, if a user takes a photo using the Shopping Shutter of a water bottle they saw and they liked and wish to find out more information about possibly purchasing or reading reviews of such water bottle, the present application could identify that the main element of the photo is the water bottle and suggest websites or applications that show where to purchase such water bottle (or similar ones) nearby the user's georeferenced location, suggest websites or applications that show reviews of such water bottle (and or similar ones) so the user can make an informed decision, suggest websites or applications that show where to purchase such water bottle online and compare prices, among other options.

When a user captures a photo with the Shopping Shutter, they selectively intend to use the content of such photo for a purpose related to shopping, and therefore the artificial intelligence platform processes such captured photo based on the chosen selective capture button and provides output information in order to present the user with a dynamic content screen that automatically re-orders the found and suggested websites and/or applications related to the shopping process. As used herein, shopping functionality alternatives include but are not limited to websites, applications, contacts, media content, and or information that are related to the captured content (130) in the context of the shopping functionality.

Sharing Functionality

In an embodiment of the invention, at least one of the selective capture buttons operates as a Sharing Shutter related to a Sharing Functionality, wherein the Sharing Shutter is a shutter that, when the user takes a photo using such button then the application selectively sends such image and information to an artificial intelligence platform that is able to analyze the information of the image (as previously described), and interact with the web and with its own learning patters in order to suggest an easy and intuitive manner of sharing such photo based on the intention of the user. The Sharing Functionality is therefore related to providing the best combinations and alternatives to easily share such photo with other users and/or social media platforms, as intended by the user.

The Sharing Functionality uses artificial intelligence that, through machine learning and other methods, predominantly has learned from user's past input actions, interactions with other applications, and messaging patterns and content, to suggest and show a selection of recipients/communication channels and/or social media platforms. In this embodiment, the use of artificial intelligence, as previously described, helps to identify, based on the user's prior communications and patterns, the best combination of recipients and communication channels that intuitively would be a good candidate to receive the content intended to be shared by the user. For example, a user takes a photo of a legal document with the Sharing Shutter and wishes to quickly share it with their lawyer, wherein the artificial intelligence platform detects the photo's content, and based on previous messaging patterns and analyzes suggests the user to share that photo with their lawyer, who is usually sent these types of photos of legal documents.

When a user captures a photo with the Sharing Shutter, they selectively intend to share that photo with a user and/or social media platform, and therefore the artificial intelligence platform processes such captured photo based on the chosen selective capture button and provides output information in order to present the user with a dynamic content screen that automatically re-orders the recipients and/or social media platforms so that the user can make a quick selection of the recipients of the photo. As used herein, sharing functionality alternatives include but are not limited to combinations and alternatives to easily share such photo with other users and/or social media platforms, as intended by the user based on the captured content (130).

For example, if a user usually sends photos of birds to one of its contacts that is a bird watcher, if such user takes a photo of a bird, the artificial intelligence platform should analyze the photo, determine it's a bird, and suggest such contact as a recipient for such photo. For this, the artificial intelligence platform should have learned, from the user's past interactions and analysis of the photos shared from such user and with the different recipients, in order to suggest the most suitable contact for sharing.

The artificial intelligence platform described herein processes the captured media content (130) by taking into account the input action combination (201) performed by the user and any additional instructions provided. Specifically, the artificial intelligence platform analyzes the captured media content (130) based on the at least one selective capture button (110) selected, the nature of the input action combination (201), and the additional instruction provided by the user. For example, if a user captures a series of images through consecutive inputs and adds a text or audio instruction, the artificial intelligence platform integrates this information to offer suggestions that are tailored to the user's specific intent and the synergy between the different media elements. This processing capability allows the artificial intelligence platform to offer more relevant and context-aware options, enhancing the user's experience by aligning the output with the user's original objective.

Example I

As an exemplary embodiment of the invention related to a Discovery Functionality, a method according to the present invention is implemented by a mobile device, such as a smartphone, wherein a user wishes to capture an image with the smartphone camera and use it for obtaining information related to such photo.

The user accesses the application of the present disclosure, which shows a capture screen (100) on the display (410), the capture screen having a multi-shutter view with three separate shutters having different functionalities, one Discovery Shutter, one Shopping Shutter, and one Sharing Shutter.

The user then aligns the content the user wishes to capture (image to capture) and then performs an input action (200) through a tap on the Discovery Shutter, which allows to capture such content and save it into the electronic device, as well as sending such image for processing through an Artificial Intelligence Platform related to the Discovery Functionality.

Such input action provides input to the application, wherein such image is shared with the Artificial Intelligence System which analyzes and processes such image based on the user's interaction with other users and/or applications, sharing patterns, the frequency of communications and/or interactions with other users and/or platforms, the information of the media content (texts, elements, people, colors, textures, etc.), and the geolocation of the content.

Then, in response to the processing of the Artificial Intelligence System, the smartphone displays a content screen (300), which presents the user with a plurality of selectable alternatives and options related to the Discovery Functionality, such as a website, and a plurality of applications that allow to obtain information related to such captured photo.

Example II

The present invention changes the way that people uses and exchanges information, such as images, with an innovative platform that uses artificial intelligence, as shown in the following exemplary embodiments of the invention and how it is used to generate a worldwide impact on the use of images for many purposes in a centralized and innovative manner.

As an exemplary embodiment of the invention related to a Discovery Functionality, a method according to the present invention is implemented by a mobile device, such as a smartphone, wherein a user wishes to capture an image with the smartphone camera and use it for obtaining information related to such photo.

A user is walking on the street and comes across a rare bug, and wishes to find out what type of bug it is and its scientific name. The user accesses the application of the present disclosure, which shows a capture screen (100) on the display (410), the capture screen (100) having a multi-shutter view with three separate shutters (110) having different functionalities, one Discovery Shutter, one Shopping Shutter, and one Sharing Shutter. The user then captures a photo of the bug through the content screen, by tapping on the Discovery Shutter, which activates a Discovery Functionality. The photo of the bug is then sent to an artificial intelligence platform that analyzes its content (including its geolocation, time of capture, content of the photo, among others) and provides an output of suggestions for the user that are shown in a content screen (300). The content screen then shows the photo and a plurality of options to obtain information, such as a website with different types of bugs and its names, an application that helps to learn information about the specific bug that the user took the photo of, and a website showing information of other countries where such bug may be found.

Then, the user continues walking and watches an accident happening in the vicinity, and wants to share such image with close friends. Then, the user captures a photo using the Sharing Shutter, which activates a Sharing Functionality. The photo of the accident is then sent to an artificial intelligence platform that analyzes its content (including its geolocation, time of capture, content of the photo, among others) and provides an output of suggestions for the user that are shown in a content screen (300). The content screen then shows the photo and a plurality of combinations and alternatives to easily share such photo with contacts of the user that, based on its past sharing history, would intend to share it with. For example, the content screen shows the user's frequent contacts and their related communication channels close to the photo, so the user quickly selects who to share the photo with, and the photo is then shared with such contact(s).

Then, the user keeps walking and enters a restaurant for dinner, and orders a steak dinner that looks very fancy, and wishes to share in a social media platform. Then, the user captures a photo of the plate using the Sharing Shutter, which activates a Sharing Functionality. The photo of the plate is then sent to an artificial intelligence platform that analyzes its content (including its geolocation, time of capture, content of the photo, among others) and provides an output of suggestions for the user that are shown in a content screen (300). The content screen then shows the photo of the plate and a plurality of combinations and alternatives to easily share such photo with social media platforms, such as Instagram, based on its past sharing history, would intend to share. For example, the content screen shows the user's frequent social media applications close to the photo, so the user quickly selects the application and the photo is uploaded in a fast manner.

Finally, the user has a glass of wine with the food and likes it very much, so he wants to know where to buy it. Then, the user captures a photo of the wine bottle using the Shopping Shutter, which activates a Shopping Functionality. The photo of the wine is then sent to an artificial intelligence platform that analyzes its content (including its geolocation, time of capture, content of the photo, among others) and provides an output of suggestions for the user that are shown in a content screen (300). The content screen then shows the photo of the wine and a plurality of combinations and alternatives that show where the user can purchase the wine close to the current location, as well as information and reviews regarding such wine. For example, the content screen shows websites and/or applications where the user can purchase the wine online, websites of supermarkets close by that have availability of such wine, and a wine review application that provides more information and reviews regarding such wine.

As it can be seen, the current application centralizes in an easy manner different options and functionalities through the use of a multi-shutter view and artificial intelligence, providing for an innovative platform, and can change the lifestyle of people and how people use images around the world.

Example III

As an exemplary embodiment of the invention, related to a multi-shutter functionality with input action combinations (201) and additional instructions, a method according to the present invention is implemented by a mobile device such as a smartphone, where a user wishes to capture media content (130) with varied interactions to fulfill different objectives.

The user accesses the application of the present disclosure, which presents a capture screen (100) on the display (410). The capture screen (100) comprises a multi-shutter view with three separate selective capture buttons (110), each associated with different functionalities, one Discovery Shutter, one Shopping Shutter, and one Sharing Shutter.

In this scenario, the user is at a botanical garden and wishes to document various plant species. The user performs an input action (200) by tapping on a Discovery Shutter to capture an image of a flower. After a few seconds, the user taps on the Discovery Shutter again to capture an image of a tree.

Such input action provides input to the application, wherein such images are shared with the Artificial Intelligence System which analyzes and processes such images based the information of the media content (texts, elements, people, colors, textures, etc.), time of capture, and the geolocation of the content. Furthermore, the system recognizes these as actions separated by time intervals and processes these inputs as part of a related intent.

The artificial intelligence platform analyzes the two images in context, considering the time interval between captures, and offers suggestions, for example, creating a botanical report, identifying common characteristics between the captured species, and showing common geographical information of both species.

Continuing the interaction, the user then includes an additional instruction by typing a text. This additional instruction requests the artificial intelligence platform to identify common features between the flower in the first image and the flower of the species of the tree in the second image. The artificial intelligence platform processes both images in conjunction with the user's text instruction, finding the corresponding flower of the species of tree, and analyzing characteristics such as petal structure, color, and leaf arrangement. It then provides information and suggestions for further exploration based on the analysis, such as identifying related species on the web or generating a comparative analysis report. This functionality showcases the application's ability to handle complex user inputs and deliver precise, contextually relevant results based on both visual and textual data.

Then, the user decides to share the results with a gardening community. The user double taps the Sharing Shutter, triggering the Sharing Functionality of the application. The artificial intelligence platform, having already processed the captured images, and additional instructions, recognizes the context and prepares a set of tailored sharing options.

The artificial intelligence platform analyzes the content, including the images of the flower and the tree, and the user's instruction to compare the flower of the tree with the flower in the first image. Based on the user's past sharing patterns and the information of the content, the platform suggests several sharing options. These options include posting the images and analysis directly to a gardening forum, sharing the content via a messaging app with a contact who frequently discusses botanical topics with the user, and sharing the results and suggested webpages to a social media platform.

After sharing the finding in social media, the user deletes the last action performed, which was the double tapping of the Sharing Shutter. By accessing an action history within the application, the user easily removes the previous sharing step, allowing them to refine their interactions with the platform.

The user then presses the Shopping Shutter to take a picture of a nearby gardening shop that catches their interest. The artificial intelligence platform immediately processes the captured image, identifying the shop's storefront and any visible products. Recognizing that the user is now in shopping mode, the artificial intelligence platform analyzes the content of the image, such as the shop's signage and any visible plant displays.

Based on this analysis, the artificial intelligence platform provides a variety of shopping-related options on the content screen (300). These options might include checking the store's online catalog, comparing the visible products with the flower of the first captured image and the tree of the second captured image and its flower. The artificial intelligence may also suggest purchasing specific plants or gardening tools, leveraging the user's previous botanical interests and the information from the earlier captured images.

Finally, after successfully purchasing a plant at the shop, the user initiates a new interaction, capturing a photo of the plant by simultaneously pressing the Shopping, Discovery, and Sharing Shutters. This unique combination of inputs triggers the artificial intelligence platform to process the captured content with a multi-faceted approach, leveraging the capabilities of all three functionalities.

The simultaneous input signals to the artificial intelligence platform that the user intends to perform a comprehensive action that includes discovering information, sharing insights, and exploring purchasing options, all at once. The artificial intelligence platform analyzes the image, identifying the plant species, its condition, and any related elements within the photo. Recognizing the combined intent, the platform engages the Discovery Functionality, offering the user suggestions with information about the plant, such as botanical information about the species, optimal care instructions, growth tips, and related species. It might also suggest community forums where enthusiasts discuss similar plants or recommend apps that can help the user track the plant's growth.

Simultaneously, the Sharing Functionality prepares suggestions for sharing in social media or direct messaging, and at the same time, the Shopping Functionality analyzes the image to identify any additional products that could enhance the user's gardening experience and identify the same plant as a product on online catalogs.

Based on these results, the user selects a specific combination of options among the suggestions for the Sharing Functionality, Discovery Functionality, and Shopping Functionality, finally sharing a post on a particular social media app, showing the captured image, the product on the online catalog, and its botanical information from a gardening webpage.

This example highlights the application's ability to transition seamlessly between different functionalities, from sharing and deleting actions to shopping, all while maintaining a consistent user experience.

Example IV

As an exemplary embodiment of the invention, related to a multi-shutter functionality with input combinations and additional instructions, a method according to the present invention is implemented by a mobile device such as a smartphone.

The user accesses the application of the present disclosure, which presents a capture screen (100) on the display (410). The capture screen (100) comprises a multi-shutter view with three separate selective capture buttons (110), each associated with different functionalities, one Discovery Shutter, one Shopping Shutter, and one Sharing Shutter.

In this scenario, the user is interested in obtaining information about a nearby monument that was sent as an image by a friend. The user, without capturing any multimedia content, provides the image of the monument to the application and then double taps on the Discovery Shutter.

Such action provides input to the application, wherein the image is shared with the artificial intelligence system which analyzes and processes the image based on its information (texts, elements, people, colors, textures, etc.), time of capture, and the geolocation of the content.

The artificial intelligence platform then utilizes this information to generate a set of tailored suggestions related to the monument. These suggestions might include historical details about the monument, links to articles or websites with further information, nearby tourist attractions, or related cultural events happening in the area.

The user then presses and holds the Discovery Shutter, which triggers the capture of a video of the surroundings. Upon completing the recording, the user includes an additional instruction by recording an audio in which they instruct the application to determine if the monument from the earlier image is visible within the video.

The platform processes the video alongside the text instruction and first image, utilizing advanced object recognition and comparison algorithms. It carefully scans the video frames, searching for visual matches with the monument's features previously identified in the image, such as its architectural style, specific details, or notable markers. The platform then determines whether the monument is present in the video and, if found, highlights the exact moment and location within the footage where it appears.

In response to the user's request, the artificial intelligence platform provides a detailed analysis. It marks the timestamp in the video where the monument is detected and overlays annotations to help the user easily spot it. Additionally, the platform offers contextual information, such as the monument's distance from the current location, its visibility from different angles, and suggestions on how to get a closer view if the monument is partially obscured.

Finally, the user decides to remove the last action performed, which was the additional instruction. By accessing the action history within the application, the user easily locates and deletes this specific instruction, ensuring that the content is now focused purely on the visual aspects of the monument and the surrounding video.

Then, the user selects both the image of the monument and the video of the surroundings. Wanting to shift the focus from discovery to sharing, the user double-taps on the Sharing Shutter. This action instructs the application to reassign the current Discovery functionality of both media items to the Sharing Functionality.

The platform immediately adapts, processing the selected image and video with an emphasis on creating engaging, shareable content. The platform suggests several sharing formats, such as a combined photo and video post for social media, a short video montage that highlights key moments, or a multimedia message that can be sent to specific contacts.

Additionally, the AI platform offers options to enhance the shared content by adding captions, annotations, or even integrating the previously deleted text instruction if the user chooses to reintroduce it. The content screen (300) displays these sharing options in an organized, user-friendly layout, allowing the user to customize and finalize the content before sharing it with their audience.

This extended interaction exemplifies the application's capacity to integrate external input from not in site captured media content, and video processing, allowing users to both explore and interact with their environment in an intuitive and deeply informative way, or to obtain useful suggestions based on already available media content. Further, the user is able to seamlessly transition from capturing and analyzing content to sharing and discovering more about their surroundings, all within a single, cohesive experience.

Example IV

As an exemplary embodiment of the invention related to camera selection, a method according to the present invention is implemented by a mobile device such as a smartphone.

A user is attending a business conference and selects a Work Camera. When capturing media with the selective capture buttons (110), the application provides suggestions for document scanning, business card information extraction, team sharing, among others. When the user captures a business card, the artificial intelligence platform processes the image to extract contact information, and suggests to add a new contact, to send a follow-up email, among other business suggestions.

Later, the user switches to a Travel Camera while exploring the city. When capturing media with the selective capture buttons (110), the application now provides suggestions for landmark identification, menu translation, photo sharing, among others. When capturing an image of a historical monument with a selective capture buttons the artificial intelligence platform identifies the landmark and suggests historical facts, opening hours, visitor reviews and other suggestions related to a Travel Camera.

In this manner, the user is able to customize their interaction with the multi-shutter camera application based on different usage contexts. By integrating different cameras, the application provides an context optimized and versatile tool that enhances productivity, enriches travel experiences, caters to personal interests, and many other, all within a single unified interface.

As previously mentioned, all of these options showed in the different functionalities also result from the artificial intelligence platform that is programmed to detect and analyze the content of the photos, learn from user's past input actions, searches, interests, interactions with the web and other applications, messaging patterns, among others. The artificial intelligence platform can also perform analysis of the photos to detect and analyze any elements text, symbols, logos, colors, textures, or similar parameters within the photo. Additionally, the artificial intelligence platform can perform an analysis of the photo based on its georeferenced location, which can help to identify the intent of the user when taking the photo. Further, the artificial intelligence system can perform an analysis of the photo based on the time of capture and/or the time when the user is using the application from the present disclosure.

The foregoing description of the exemplary embodiments of the invention has been presented for the purposes of illustration and description. They are not intended to be exhaustive or to limit the invention to the precise devices and steps disclosed. Many modifications and variations are possible in light of the above teaching. It is intended that the scope of the invention be limited not with this detailed description, but rather by the claims appended hereto.

The invention claimed is:

1. A multi-shutter camera application and method that selectively sends images to different artificial intelligence and innovative platforms, the method performed by an electronic device, the electronic device comprising a display incorporating a touch sensitive surface and at least one processor, the method comprising:

a) presenting a capture screen on the display having a multi-shutter view, the capture screen comprising at least one live view block and at least two selective capture buttons, for capturing media content;

b) receiving an input action, via at least one of the selective capture buttons, wherein the selective capture buttons are intended to capture media content and direct the captured content to an artificial intelligence platform to provide different uses and/or information to a user;

c) capturing media content through the input action from step b) and saving such content into the electronic device or a cloud-based application;

d) in response to the input action, selectively sending the media content to an artificial intelligence platform, where the artificial intelligence platform:

i. processes such captured media content information based on the chosen selective capture button that was used to capture the media content, and ii. processes the media content and analyzes such media content through parameters to show suitable options to the user to fulfill the objective of the captured content in the same screen that displays the captured content, wherein the artificial intelligence platform provides output information in order to present the user with a content screen; and e) presenting a content screen that shows content generated by the Artificial Intelligence Platform from step d), wherein the content screen shows a plurality of selectable alternatives and options related to the user's selected shutter and intent of capturing the content.

2. The method of claim 1, wherein the application is integrated throughout the electronic device user interface and/or a third-party application installed within the device.

3. The method of claim 1, wherein the application is a camera application.

4. The method of claim 1, comprising a camera feature configured to capture media content, and wherein the electronic device includes camera hardware and software for this purpose.

5. The method of claim 4, the camera feature comprising a camera application and/or capture processes that allow accessing and using the camera hardware in the electronic device for the capture of media content.

6. The method of claim 4, the camera hardware including different types of lenses and sensors integrated into the electronic device.

7. The method of claim 1, wherein the live view block refers to at least a portion of the capture screen that shows the live stream content that can be captured by the user, and wherein the dimensions and ratio of such live view block may be customizable by the user, and may be adapted depending on the number of selective capture buttons that are shown at the capture screen.

8. The method of claim 1, wherein the selective capture button comprises a defined selected region within the display of the electronic device that is intended to receive input in order to capture the media content, process, and download such content into the electronic device or a cloud-based application.

9. The method of claim 1, wherein the selective capture button is selected from the group comprising a shutter button, or a region configured to receive an input action.

10. The method of claim 1, wherein the media content that can be captured through the application includes photos or videos.

11. The method of claim 1, wherein a separate folder within the camera roll or photo view application of the electronic device is created, wherein such folder displays the media content captured through the capture screen.

12. The method of claim 11, wherein by tapping an image or other media content within such separate folder, multiple options for Artificial Intelligence platforms are shown, so the user can select which one to use to process to show related options based on the user's selection.

13. The method of claim 1, wherein the electronic device is a mobile phone and wherein the electronic device comprises a touch sensitive surface.

14. The method of claim 1, wherein the input action includes one or more actions and/or motions performed by the user, which are selected from the group comprising at least one of a touch, a click, a tap, a swipe, a flicking, a flinging, or a grabbing of a portion of an interface provided for display on a display screen, and combinations thereof.

15. The method of claim 1, wherein the input action includes a motion or pressure made by the user's hand or fingers that is detected by the electronic device.

16. The method of claim 1, wherein the artificial intelligence platform is programmed to detect and analyze the content of the captured content, learn from user's past input actions, searches, interests, interactions with the web and other applications, messaging patterns, and combinations thereof.

17. The method of claim 1, wherein the artificial intelligence platform is configured to perform analysis of the media content to detect and analyze any elements, text, symbols, logos, colors, textures, based on its georeferenced location, based on the time of capture and/or the time when the user is using the application from the present disclosure, and combinations thereof.

18. The method of claim 1, wherein the different selective capture buttons have different functions that can be predefined in the application, or that can change manually or automatically based on a series of inputs.

19. The method of claim 1, wherein at least one of the selective capture buttons operates as a Discovery Shutter related to a Discovery Functionality.

20. The method of claim 19, wherein the Discovery Shutter is a shutter that, when the user takes a photo using such button then the application selectively sends such image and information to the artificial intelligence platform that processes the image, and interact with the web and with its own learning patterns in order to suggest the best applications, websites, or functionalities related to such photo.

21. The method of claim 1, wherein at least one of the selective capture buttons operates as a Shopping Shutter related to a Shopping Functionality.

22. The method of claim 21, wherein the Shopping Shutter is a shutter that, when the user takes a photo using such button then the application selectively sends such image and information to an artificial intelligence platform that is able to analyze the information of the image, and interact with the web and with its own learning patterns in order to suggest the best applications, websites, or functionalities related to such photo.

23. The method of claim 1, wherein at least one of the selective capture buttons operates as a Sharing Shutter related to a Sharing Functionality.

24. The method of claim 23, wherein the Sharing Shutter is a shutter that, when the user takes a photo using such button then the application selectively sends such image and information to an artificial intelligence platform that is able to analyze the information of the image, and interact with the web and with its own learning patterns in order to suggest an easy and intuitive manner of sharing such photo based on the intention of the user.

25. The method of claim 1, wherein the input action, is received over at least one of the selective capture buttons as an input action combination selected from the group comprising: actions separated by time intervals, individual inputs, simultaneous inputs, prolonged inputs, scroll inputs, and combinations thereof.

26. The method of claim 25, wherein upon performing the input action, an option of including additional instructions is provided, wherein the additional instructions are selected from the group comprising text and audio.

27. The method of claim 26, wherein the artificial intelligence platform processes the captured media content information based on the at least one selective capture button that was used to capture the media content, the input action combination, and the additional instructions.

28. The method of claim 1, wherein the multi-shutter camera application and method provides a plurality of selectable cameras, each camera corresponding to a different usage context, wherein each camera comprises a set of selective capture buttons configured according to the corresponding usage context, and wherein the artificial intelligence platform is specific to each camera, such that the artificial intelligence platform processes the captured media content based on a selected camera, allowing the user to switch between cameras to suit different situations.

29. The method of claim 1, wherein the multi-shutter camera application comprises only one camera corresponding to one usage context, the camera comprising a set of selective capture buttons configured according to the usage context, and wherein the artificial intelligence platform is specific to the camera, such that the artificial intelligence platform processes the captured media content based on the camera.

30. The method of claim 1, wherein the predetermined parameters include: geolocation, time of capture, and content of the photo.

* * * * *